(12) United States Patent
Stent

(10) Patent No.: US 11,587,419 B2
(45) Date of Patent: Feb. 21, 2023

(54) METHODS AND SYSTEMS PROVIDING AN INTELLIGENT CAMERA SYSTEM

(71) Applicant: Toyota Research Institute, Inc., Los Altos, CA (US)

(72) Inventor: Simon A. I. Stent, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 1046 days.

(21) Appl. No.: 15/669,427

(22) Filed: Aug. 4, 2017

(65) Prior Publication Data

US 2019/0043327 A1 Feb. 7, 2019

(51) Int. Cl.
| | |
|---|---|
| *G08B 13/196* | (2006.01) |
| *G06T 7/215* | (2017.01) |
| *H04N 5/232* | (2006.01) |
| *H04N 5/247* | (2006.01) |
| *G06T 3/00* | (2006.01) |
| *B60R 1/00* | (2022.01) |
| *H04N 7/18* | (2006.01) |

(Continued)

(52) U.S. Cl.
CPC .......... *G08B 13/19647* (2013.01); *B60R 1/00* (2013.01); *G06T 3/0012* (2013.01); *G06T 7/215* (2017.01); *G06V 10/255* (2022.01); *G06V 20/13* (2022.01); *G06V 20/58* (2022.01); *G06V 20/597* (2022.01); *G06V 40/19* (2022.01); *H04N 5/23219* (2013.01); *H04N 5/23296* (2013.01); *H04N 5/247* (2013.01); *H04N 7/188* (2013.01); *B60R 2300/105* (2013.01); *B60R 2300/605* (2013.01); *B64C 2201/127* (2013.01); *G06T 2207/10032* (2013.01); *G06V 10/16* (2022.01); *G06V 2201/08* (2022.01); *H04N 5/23212* (2013.01)

(58) Field of Classification Search
CPC . G08B 13/19647; G06T 7/215; G06T 3/0012; G06K 9/0063; G06K 9/00805; G06K 9/00845; G06K 9/3241; H04N 5/23296; H04N 5/23219; H04N 5/247; H04N 7/188; B60R 1/00; B06K 9/00604
See application file for complete search history.

(56) References Cited

U.S. PATENT DOCUMENTS

| | | |
|---|---|---|
| 7,990,422 B2 | 8/2011 | Ahiska et al. |
| 9,070,289 B2 | 6/2015 | Saund et al. |

(Continued)

FOREIGN PATENT DOCUMENTS

| | | |
|---|---|---|
| JP | 2016-192669 A | 11/2016 |
| KR | 101311859 B1 | 9/2013 |

(Continued)

*Primary Examiner* — Khoi H Tran
*Assistant Examiner* — Rodney P King
(74) *Attorney, Agent, or Firm* — Dinsmore & Shohl LLP

(57) ABSTRACT

Systems and methods for an intelligent camera system are provided. A method includes receiving, from a first camera in a vehicle, view data corresponding to an area from a vantage point of the vehicle. The method further includes detecting a region of interest from the view data provided by the first camera. The method also includes providing the region of interest to a second camera in the vehicle. The method further includes receiving, from the second camera, zoom view data corresponding to a zoom view of the region of interest.

20 Claims, 10 Drawing Sheets

(51) Int. Cl.
*G06V 10/20* (2022.01)
*G06V 20/13* (2022.01)
*G06V 20/58* (2022.01)
*G06V 20/59* (2022.01)
*G06V 40/19* (2022.01)
*G06V 10/10* (2022.01)

(56) References Cited

U.S. PATENT DOCUMENTS

| | | | |
|---|---|---|---|
| 9,619,718 B2 | 4/2017 | Michmerhuizen et al. | |
| 9,823,744 B2* | 11/2017 | Publicover | G06F 3/017 |
| 2006/0077255 A1* | 4/2006 | Cheng | G06K 9/0063 |
| | | | 348/143 |
| 2009/0046157 A1* | 2/2009 | Cilia | G06K 9/3233 |
| | | | 348/207.1 |
| 2009/0168185 A1* | 7/2009 | Augustine | B60J 3/04 |
| | | | 359/613 |
| 2010/0201816 A1* | 8/2010 | Lee | B60R 1/12 |
| | | | 348/148 |
| 2011/0285995 A1* | 11/2011 | Tkaczyk | G01J 3/02 |
| | | | 356/326 |
| 2012/0069224 A1* | 3/2012 | Cilia | G06K 9/325 |
| | | | 348/240.99 |
| 2013/0258089 A1 | 10/2013 | Lyons et al. | |
| 2014/0139680 A1* | 5/2014 | Huang | G06K 9/6267 |
| | | | 348/159 |
| 2015/0158427 A1* | 6/2015 | Lee | B60Q 9/008 |
| | | | 701/1 |
| 2015/0235092 A1* | 8/2015 | Mei | G06K 9/00805 |
| | | | 382/103 |
| 2016/0048725 A1* | 2/2016 | Holz | G01P 13/00 |
| | | | 345/156 |
| 2016/0297362 A1* | 10/2016 | Tijerina | H04N 5/23293 |
| 2016/0339959 A1* | 11/2016 | Lee | B62D 15/0265 |
| 2017/0060234 A1* | 3/2017 | Sung | G06F 3/1431 |
| 2017/0094184 A1 | 3/2017 | Gao et al. | |
| 2017/0195562 A1* | 7/2017 | Desai | H04N 5/23238 |
| 2017/0287446 A1* | 10/2017 | Young | G02B 27/0101 |

FOREIGN PATENT DOCUMENTS

| | | |
|---|---|---|
| KR | 101360246 B1 | 2/2014 |
| KR | 101503825 B1 | 3/2015 |
| WO | 2016-185691 A1 | 11/2016 |

* cited by examiner

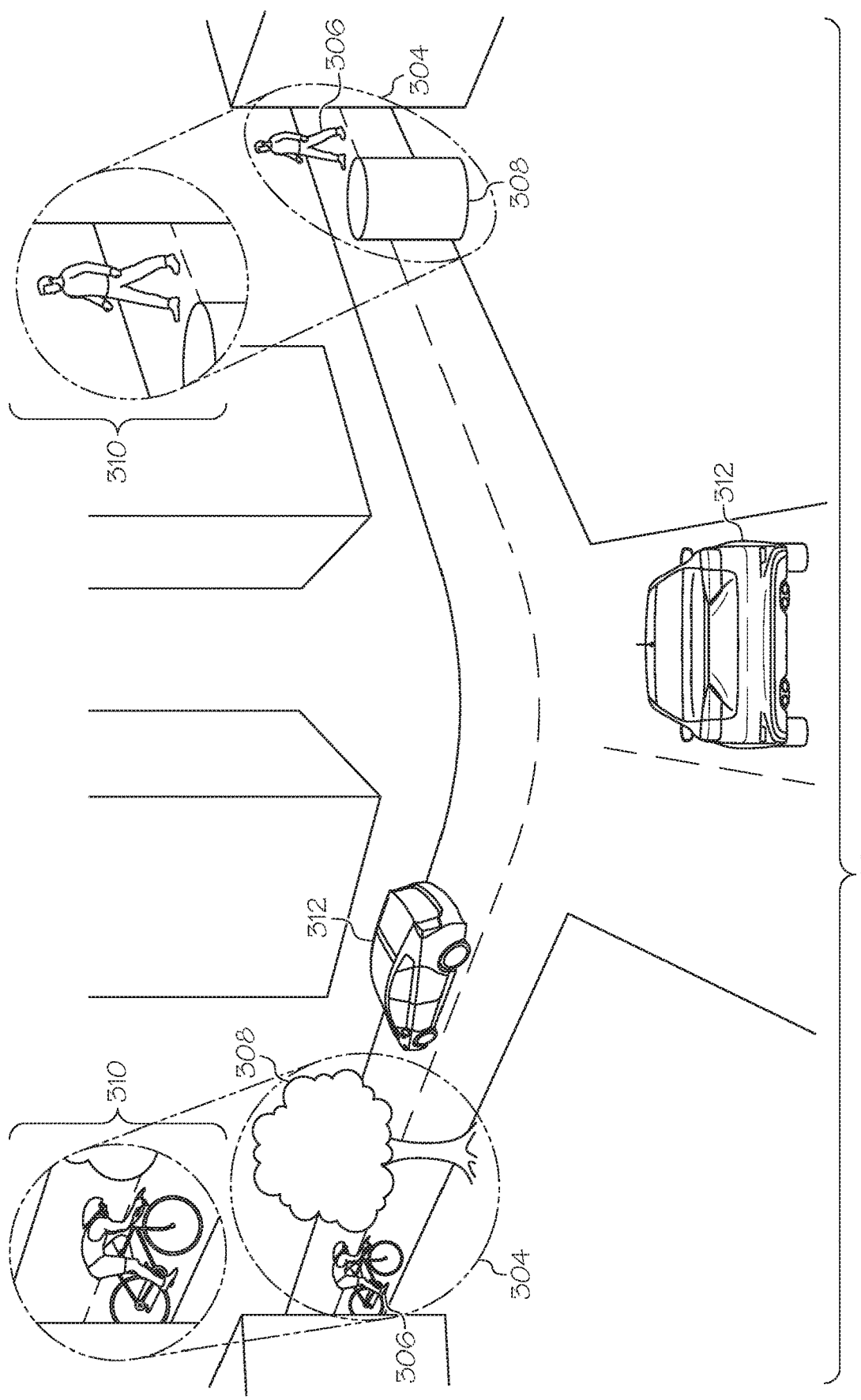

METHODS AND SYSTEMS PROVIDING AN INTELLIGENT CAMERA SYSTEM

TECHNICAL FIELD

The present disclosure generally relates to vehicle camera systems and, more particularly, to methods and systems for providing zoom views of objects using multiple cameras for active detection and monitoring.

BACKGROUND

Automobile drivers and autonomous vehicles alike encounter objects that require careful attention. Other vehicles, pedestrians, and road hazards all pose collision hazards that require active monitoring. Passengers can often act as a second pair of eyes for a driver by alerting the driver to a potential hazard upon which the driver may not be focused.

However, drivers are often alone in their vehicles and forced to rely solely upon their own vision to detect all potential hazards. Even when passengers are present to provide additional sets of eyes, many hazards are not clearly visible to the human eye due to distance, speed, and/or obscurity. For example, vehicles can emerge quickly from around a 'blind corner' that leaves a driver with little time to react. Autonomous vehicles face similar challenges posed by such hazards. While conventional camera systems offer drivers limited viewing assistance, such as a rear-view camera to reveal objects directly behind the vehicle, this does not identify or predict potential hazards.

Therefore, a need exists to alert drivers and assist autonomous vehicles with improved detection of potential hazards to preemptively recognize and avoid hazards.

SUMMARY

In one embodiment, a method of vehicle-based hazard detection utilizing cameras to improve vehicular operation is disclosed. The method includes receiving, from a first camera in a vehicle, view data corresponding to an area from a vantage point of the vehicle. The method further includes detecting a region of interest from the view data provided by the first camera. The method also includes providing the region of interest to a second camera in the vehicle. Further still, the method includes receiving, from the second camera, zoom view data corresponding to a zoom view of the region of interest.

In another embodiment, a vehicle includes a camera system for hazard detection to improve vehicular operation. The camera system includes a processing device and a non-transitory, processor-readable storage medium, the non-transitory, processor-readable storage medium including one or more programming instructions that, when executed, cause the processing device to receive, from a first camera in a vehicle, view data corresponding to an area from a vantage point of the vehicle. The instructions further cause the processing device to detect a region of interest from the view data provided by the first camera. The instructions also cause the processing device to provide the region of interest to a second camera in the vehicle. The instructions further cause the processing device to receive, from the second camera, zoom view data corresponding to a zoom view of the region of interest.

In yet another embodiment, a camera system for hazard detection to improve operation includes a processing device. The camera system also includes a non-transitory, processor-readable storage medium, the non-transitory, processor-readable storage medium including one or more programming instructions that, when executed, cause the processing device to receive, from a first camera, view data of an area from a vantage point of the system. The instructions further cause the processing device to output the view data to a display device. The instructions also cause the processing device to detect a region of interest within the view data provided by the first camera. The instructions further cause the processing device to provide the region of interest to a second camera. The instructions also cause the processing device to receive, from the second camera, zoom view data corresponding to a zoom view of the region of interest. The instructions further cause the processing device to output the zoom view data corresponding to the zoom view of the region of interest to the display device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 depicts a diagram schematically illustrating an exemplary vehicle surveying an intersection utilizing a plurality of cameras to monitor objects of varying visibility, according to one or more embodiments described and illustrated herein;

DETAILED DESCRIPTION

Embodiments of the present disclosure are directed to methods and systems providing intelligent object detection. Cameras may be used to present a fixed perspective to a driver, such as a rear-view camera to reveal hidden obstacles behind the vehicle. Hazards can appear quickly, and from distances that make detection difficult for either the human eye or a fixed camera. A tracking camera may offer the ability to zoom in upon and/or otherwise enhance images of objects or regions appearing within the view of a fixed camera. This zoom view may provide the ability to track and analyze the object to identify the object and make predictions. For example, mirror-based actuation may allow this additional camera to maneuver at high speed and accuracy. Additionally, a gaze-tracking camera may be used to act as a second pair of eyes so that the tracking camera can focus in upon whatever has attracted the driver's gaze. These features may be utilized to decrease hazards by allowing drivers and/or autonomous vehicles to be alerted to, track, and preemptively react to potential hazards.

Figure 1:
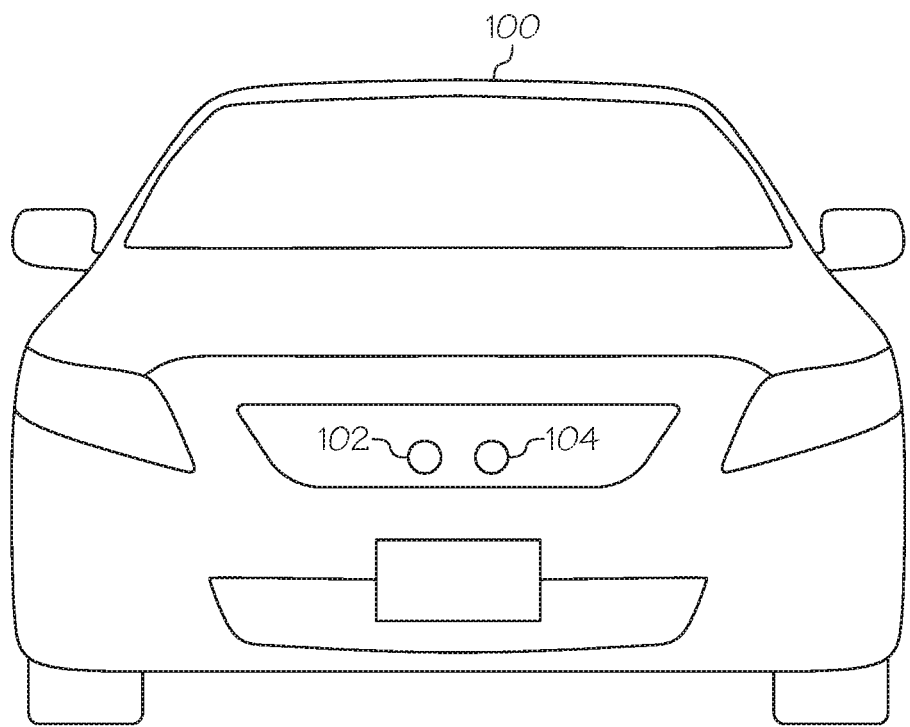
FIG. 1 depicts a diagram schematically illustrating an exemplary vehicle having a plurality of forward-facing cameras, according to one or more embodiments described and illustrated herein.

Referring now to FIG. 1, an exemplary frontal view of a vehicle 100 is schematically depicted. A vehicle 100 may include anything capable of transporting one or more passengers, including but not limited to cars, trucks, motorcycles, bicycles or any other type of passenger-powered vehicles, aircraft, spacecraft, watercraft, and submarines. A vehicle 100 may be navigated by an operator, such as a driver, pilot, captain, etc. In other embodiments, the vehicle may be partially autonomous, for example where the vehicle completes some tasks for the driver, such as parking or keeps the vehicle in a lane. In still other embodiments, the vehicle may be autonomous, for example where the vehicle operates with no input or minimal input (such as providing destination information or route preferences) from any occupant.

A wide angle camera 102 and a tracking camera 104 are depicted in this embodiment at the front of the vehicle 100. Any number of wide-angle cameras 102 and/or tracking cameras 104 may be utilized. In some embodiments, wide-angle cameras 102 may be present without tracking cameras 104, or vice-versa. A wide-angle camera 102 and/or tracking camera 104 may be utilized within or affixed to any suitable portion of the vehicle 100 located inside or on the exterior of the vehicle 100. In various embodiments, cameras may be located, by way of non-limiting example, on the top, bottom, front, back, and/or any side of a vehicle 100, and may be located independent of the location of any other wide-angle camera 102 and/or tracking camera 104. Any suitable type of image-capture device (still, video, digital, analog, etc.) may be utilized for a wide angle camera 102 and/or a tracking camera 104, along with any suitable type of imaging (visible light, night-vision, infra-red, microwave, etc.) to capture a visual representation. A wide-angle camera 102 and/or a tracking camera 104 may have any suitable viewing angle (such as up to or above a sufficient angle, such as 180°) and/or range of motion (such as being able to rotate a certain distance, such as 270°). For example, in some embodiments, the wide-angle camera 102 may provide a wide view to allow viewing of a large number of regions and objects simultaneously, yet lack sufficient detail and/or resolution to analyze specific areas within the wide view, and may also provide limited or no panning capability and/or range of motion. View data may be output by the wide-angle camera 102 corresponding to the wide view, and may utilize any suitable type of image/video format. In some embodiments, the tracking camera 104 may provide a more detailed view of regions and objects, along with panning and zooming functionality, yet be too focused on specific regions or objects to provide a wider view to encompass other regions or objects. In some embodiments, the tracking camera 104 provides a zoom view, which may include zooming in, zooming out, panning, tilting, focusing, etc., with respect to the wide-angle view. Zoom view data may be received from the tracking camera 104 and may utilize any suitable type of image/video format. In various embodiments, the zoom view may be utilized as part of object/image recognition and/or tracking.

Figure 2:
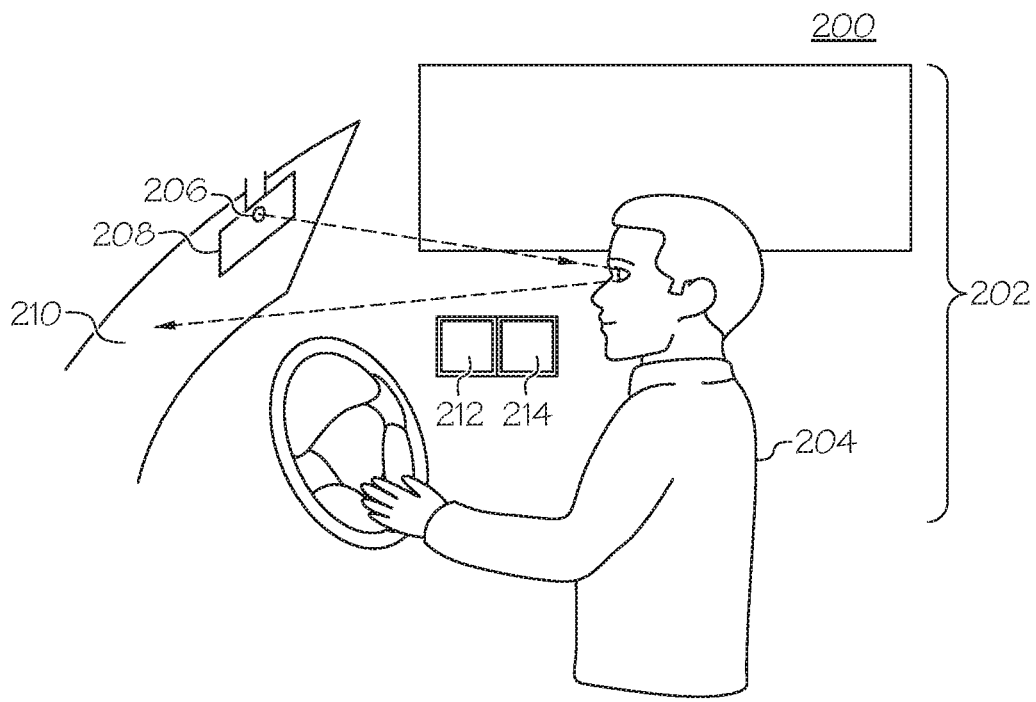
FIG. 2 depicts a diagram schematically illustrating exemplary gaze detection of a driver, according to one or more embodiments described and illustrated herein.

Turning to FIG. 2, a diagram 200 depicts one embodiment showing an example of a vehicle passenger compartment 202 featuring a gaze detector 206, located on a rearview mirror 208, which tracks the gaze of a driver 204 looking out the windshield 210. In various embodiments, the gaze detector 206 may be located, by way of non-limiting example, on the top, bottom, front, back, on a side, and/or any other suitable portion located inside of or on the exterior of the vehicle 100. Any suitable type of saccading camera system may be utilized, which in some embodiments may be a camera system that provides for rapid camera movements. In other embodiments, two or more cameras may be coordinated in saccading movement. In various embodiments, saccading movement of one or more cameras may correspond to detected eye movement, such as with gaze detection. For example, a gaze detector 206 may utilize any suitable type of image-capture device (still, video, digital, analog, etc.) and utilize any suitable type of imaging (visible light, night-vision, infra-red, microwave, etc.). Any number of gaze detectors 206 may be utilized and may be located anywhere within or on a vehicle 100 to observe a gaze of any occupant, such as a driver and/or a passenger. Other embodiments (e.g., autonomous vehicles) may not utilize a gaze tracker. Output from the gaze detector 206 may be utilized to direct movement of a tracking camera 104. Some embodiments may track the gaze of a driver 204 based upon a gaze directed towards a windshield 210 (for example), such as based on the movement of one or both eyes of the driver 204 or another vehicle occupant. In other embodiments, gaze detection may be performed with respect to the gaze of the driver 204 or another vehicle occupant directed towards one or more displays 212, 214. In still other embodiments, other types of gaze detection that may be utilized with respect to the attention of the driver 204 or other vehicle occupants include by way of non-limiting examples, head movement, torso movement, limb movement, and/or verbal indications, any and/or all of which may also be used in combination with the tracking of eye movements. While a wide angle camera is stationary in some embodiments, other embodiments may feature a moving wide angle camera. For example, output from the gaze detector 206 may be utilized to direct movement of a wide angle camera. In various embodiments, gazes from different vehicle occupants may each independently direct movement of a camera.

In some embodiments, a first display 212 provides output from the wide angle camera and a second display 214 displays output from the tracking camera. A display may be any type of output device capable of displaying an image such as a monitor, wearable device, and/or holographic display. Any number of monitors may be utilized, and a display may show output from multiple cameras by any suitable technique such as split-screen and or alternating output from different cameras. A display may be located on or in any internal or external part of the vehicle 100.

Turning to FIG. 3, a diagram 300 depicts an example of a wide-angle view 302 as provided by a wide-angle camera. For illustrative purposes, some embodiments utilize zones of interest 304 or areas of interest (hereinafter used interchangeably) may include potential hazards 306 and obstructions 308. Other embodiments may only include only hazards 306 or only obstructions 308 within a given zone of interest 304. In embodiments, a hazard may be anything that could potentially pose a hazard to the vehicle and/or any occupants. Hazards 306 are depicted in this embodiment with close-up views 310 that respectively depict a bicyclist and a pedestrian, each around a separate corner, both of which may be difficult to detect with either the human eye or the wide-angle view 302. In this embodiment, the bicyclist and pedestrian are on the roadway and therefore could pose a potential collision hazard, for example, either by running into the vehicle 100, being hit by the vehicle, and/or obstructing the path of the vehicle 100. Other examples of hazards may include animals, fallen trees, fallen utility poles, accident scenes in the roadway, etc. As can be seen, each hazard 306 is located at a region of interest 304 within the wide angle view 302 of the wide angle camera, with each potential hazard 306 being obscured by the viewing angle and/or obstructions 308. Obstructions may be anything that impedes the ability of the vehicle 100 and/or its occupants to perceive (visually, audio, etc.) the surrounding environment and may include, by way of non-limiting examples, buildings, trees, parked vehicles, moving vehicles, etc. Additionally, other vehicles 312 may be monitored as well, regardless of whether they pose a current hazard. For example, a driver may gaze upon a region of interest 304 where, based upon the distance, it is ambiguous to the driver what is actually within the region of interest 304. Any suitable type of camera operation/movement may be utilized.

By detecting the gaze of the driver, the tracking camera may operate as a "second pair of eyes" for the driver and zoom in upon that region. This "second pair of eyes" may also be used to have the tracking camera look in the opposite direction of where the driver is currently looking (e.g., the tracking camera checks to the right in a busy intersection when the driver is looking left and getting ready to pull out into the intersection). The tracking camera and/or another device may analyze the region of interest 304 and/or any objects located therein to identify and/or track the region and/or any such objects. Any suitable type of image/object recognition/detection algorithm(s) may be utilized. Any suitable type of object tracking algorithm(s) may be utilized. In other embodiments, image/object recognition/detection/tracking algorithm(s) may be directly applied to the output of the wide-angle view 302 to detect objects and/or regions of interest 304 without use of gaze detection. As discussed above, some embodiments use various types of gaze detection with respect to the attention of vehicle occupants. Based upon an image/object recognition/detection algorithm, an object and/or region of interest 304 may be classified and/or identified as a hazard 306.

Figure 4A:
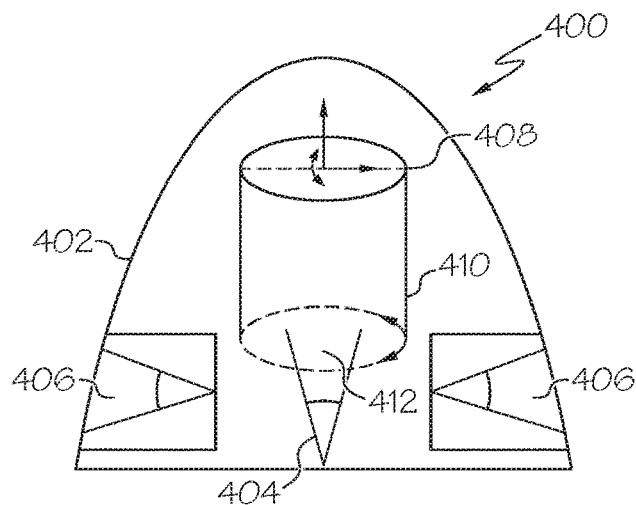
FIG. 4A depicts a perspective view of mirror-based camera actuation, according to one or more embodiments shown and described herein.

Turning to FIG. 4A, diagram 400 depicts an example of mirror-based camera actuation within a housing 402, such as a transparent dome depicted here. Any suitable type of housing may be utilized, including any suitable shape and/or material(s). In this example, mirror-based actuation provides a tracking camera 104 with panning and/or tilting capabilities that are faster than what would otherwise be possible with non-mirror based systems. For example, a detected object moving at a very high rate of speed may be very difficult for a conventional non-mirror based camera to follow. If the camera pans/tilts too slowly, the object may disappear from view, which may impede the ability to perform object recognition. Here, a fixed camera 404 (which in this embodiment is a tracking camera) faces a movable mirror 410, which tilts on two axes 408 in this embodiment, specifically the x and z axes, although other types of movement are possible in other embodiments. Here, the movable mirror 410 tilts around the z-axis, which passes through an optical center of fixed camera 404 and around the x-axis. The movable mirror 410 in this embodiment fills the field of view of the fixed camera 404. Images from the fixed camera 404 are undistorted utilizing the two determined rotation angles. An effective point of view 412 is depicted with respect to the fixed camera 404.

Any suitable type of fixed camera 404, such as a high frame rate camera, may be utilized. A high focal lens may be utilized to resolve at higher resolution for, example, a distant or thin object, although any suitable type of lens may be utilized. One or more other cameras 406 may also be present within the housing 402, which may or may not include their own moveable mirrors and/or focal lenses. For illustrative purposes, one of the other cameras 406 may utilize wide angles lens corresponding to the wide angle camera, a plurality of which may cover up to 360° with wide angle lenses.

Figure 4B:
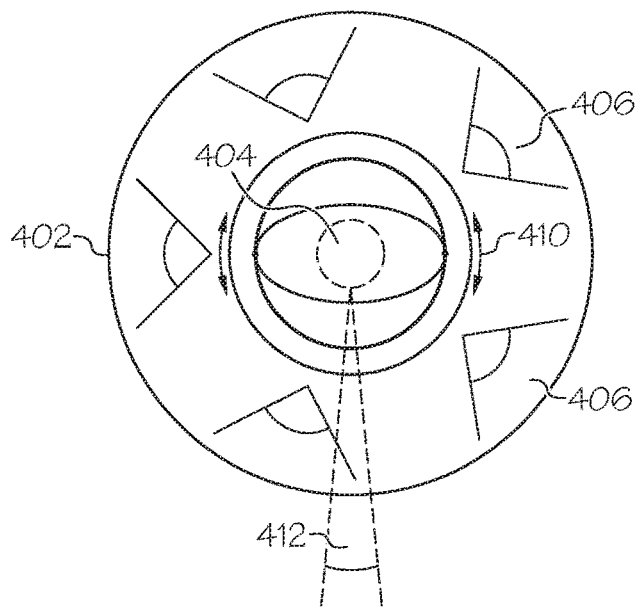
FIG. 4B depicts a top view of mirror-based camera actuation, according to one or more embodiments shown and described herein.

Turning to FIG. 4B, depicts a top view of the example from FIG. 4a of mirror-based camera actuation within a housing 402. An effective point of view 412 is depicted with respect to the fixed camera 404 with a focal lens in this embodiment.

Figure 4C:
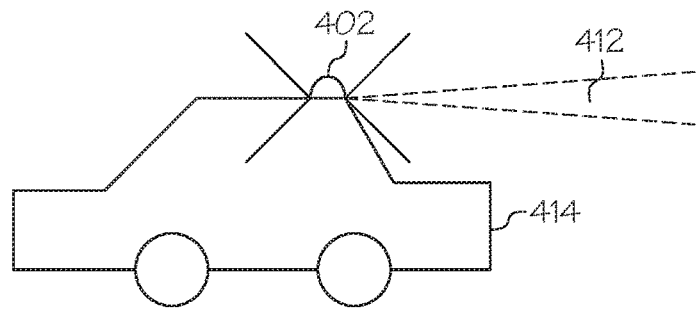
FIG. 4C depicts a side view of an exemplary vehicle utilizing mirror-based camera actuation, according to one or more embodiments shown and described herein.

FIG. 4C, depicts a side view of the example from FIG. 4A of mirror-based camera actuation within a housing 402 atop a vehicle 414. In this embodiment, an effective point of view 412 faces towards the front of the vehicle 414. In various embodiments, the housing 402 and/or the point of view 412 may be located, by way of non-limiting example, on the top, bottom, front, back, on a side, and/or any other suitable portion located inside of or on the exterior of the vehicle 414.

Figure 5A:
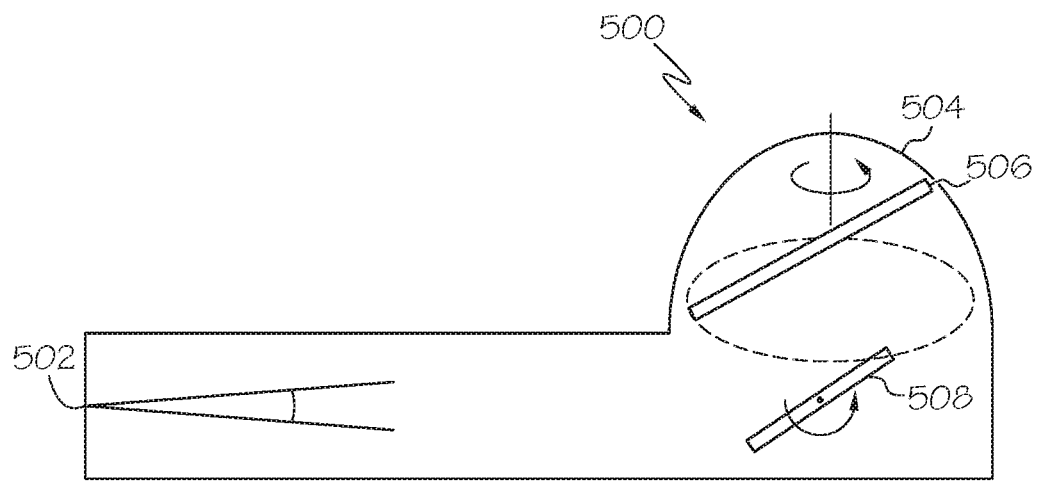
FIG. 5A depicts a side view of multi-mirror-based camera actuation, according to one or more embodiments shown and described herein.

Turning to FIG. 5A, a diagram 500 depicts a side view of another embodiment utilizing separate mirrors for multi-mirror-based camera actuation within a housing 504, depicted in this embodiment as a transparent housing, although any suitable type of housing may be utilized, including any suitable shape and/or material(s). A fixed camera 502 may be used, which may be (for example) a tracking camera with a high framerate and a high focal lens. A first mirror 508 may provide tilt, and a second mirror 506 may provide panning. In this embodiment, the first mirror 508 provides a small amount of tilt, and the second mirror 506 can pan 360°. Other embodiments may utilize different configurations of mirrors (including any number of mirrors in any suitable arrangement), configured to provide various amounts tilt, pan, and/or any other suitable type of movement.

Figure 5B:
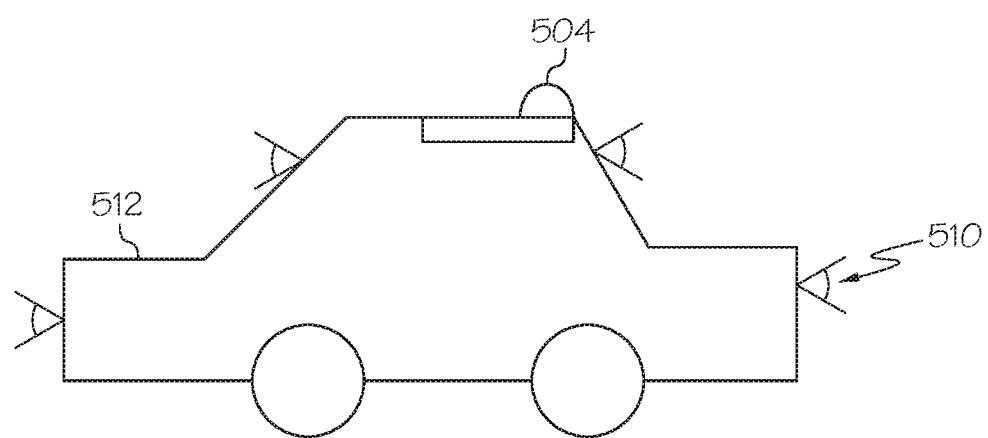
FIG. 5B depicts a side view of an exemplary vehicle utilizing multi-mirror-based camera actuation, according to one or more embodiments shown and described herein.

FIG. 5B depicts a side view of the example from FIG. 5A of multi-mirror-based camera actuation in the housing 504 atop a vehicle 512. In this embodiment, fixed wide angle cameras provide 360° coverage from a different location 510 on the vehicle 512. In various embodiments, the housing 504 and/or the different location 510 may be located, by way of non-limiting example, on the top, bottom, front, back, on a side, and/or any other suitable portion located inside of or on the exterior of the vehicle 512.

Figure 6:
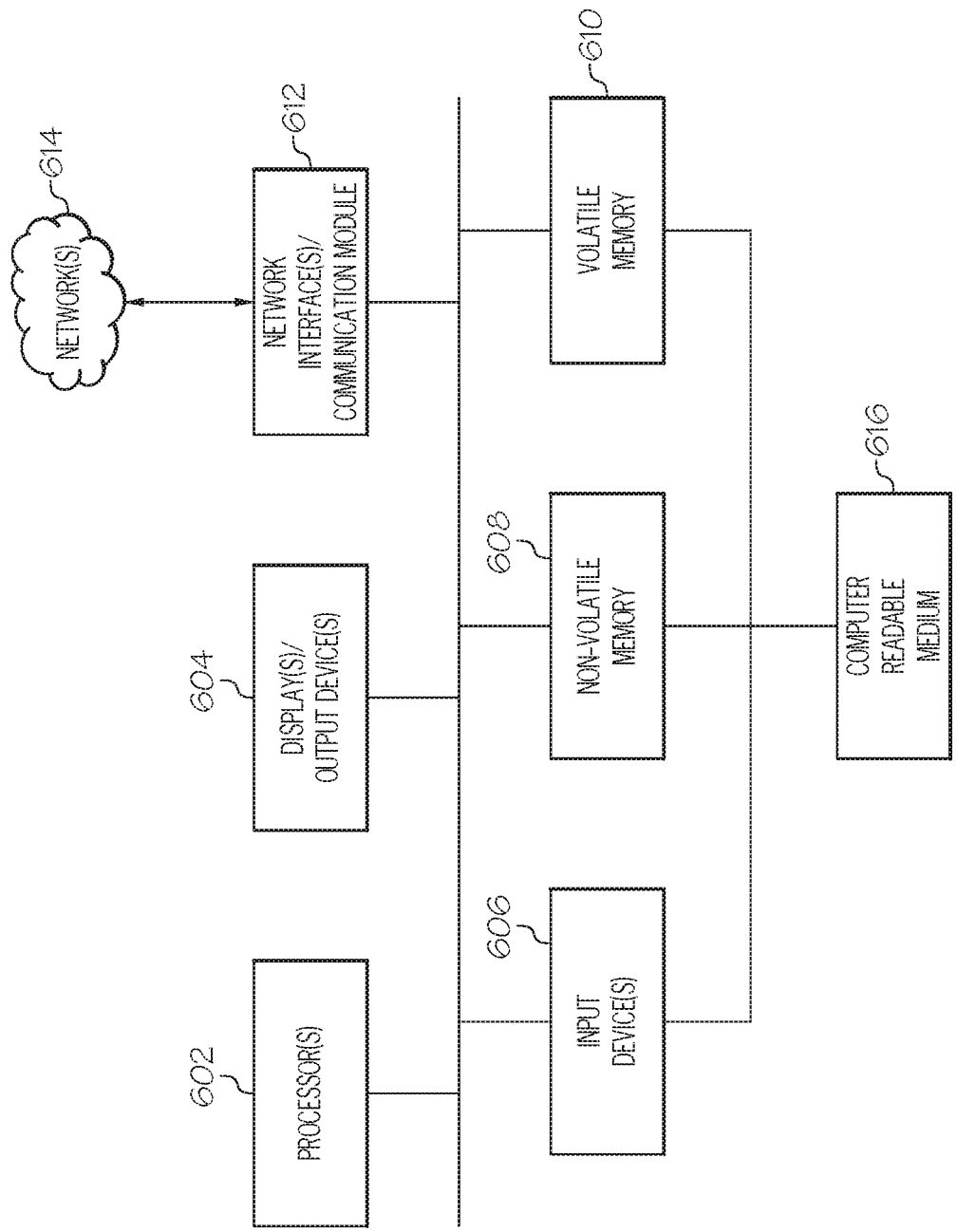
FIG. 6 schematically illustrates an exemplary computing device utilized in an intelligent camera system, according one or more embodiments shown and described herein.

Turning to FIG. 6, a block diagram illustrates an exemplary computing device 600, through which embodiments of the disclosure can be implemented. The computing device 600 described herein is but one example of a suitable computing device and does not suggest any limitation on the scope of any embodiments presented. Nothing illustrated or described with respect to the computing device 600 should be interpreted as being required or as creating any type of dependency with respect to any element or plurality of elements. In various embodiments, a computing device 600 may include, but need not be limited to, a desktop, laptop, server, client, tablet, smartphone, in-vehicle computing devices, or any other type of device that can compress data. In an embodiment, the computing device 600 includes at least one processor 602 and memory (non-volatile memory 608 and/or volatile memory 610). The computing device 600 may include non-volatile memory 608 (ROM, flash memory, etc.), volatile memory 610 (RAM, etc.), or a combination thereof. In some embodiments, the at least one processor 602 is coupled to the non-volatile memory 608 and/or volatile memory 610. The computing device 600 may utilize, by way of non-limiting example, RAM, ROM, cache, fiber optics, EPROM/Flash memory, CD/DVD/BD-ROM, hard disk drives, solid-state storage, optical or magnetic storage devices, diskettes, electrical connections having a wire, any system or device that is of a magnetic, optical, semiconductor, or electronic type, or any combination thereof.

The computing device 600 can include one or more displays and/or output devices 604 such as monitors, speakers, headphones, projectors, wearable-displays, holographic displays, and/or printers, for example. The computing device 600 may further include one or more input devices 606 which can include, by way of example, any type of mouse, keyboard, disk/media drive, memory stick/thumb-drive, memory card, pen, touch-input device, biometric scanner, voice/auditory input device, motion-detector, camera, scale, etc.

A network interface 612 can facilitate communications over a network 614 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. The computing device 600 may include one or more network interfaces 612 to facilitate communication with one or more remote devices, which may include, for example, client and/or server devices. A network interface 612 may also be described as a communications module, as these terms may be used interchangeably. Network interface 612 can be communicatively coupled to any device capable of transmitting and/or receiving data via the network 614. Accordingly, the network interface hardware 612 can include a communication transceiver for sending and/or receiving any wired or wireless communication.

For example, the network interface hardware 612 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable medium 616 may comprise a plurality of computer readable mediums, each of which may be either a computer readable storage medium or a computer readable signal medium. A computer readable medium 616 may reside, for example, within an input device 606, non-volatile memory 608, volatile memory 610, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media are non-transitory, and exclude propagated signals and carrier waves.

Figure 7:
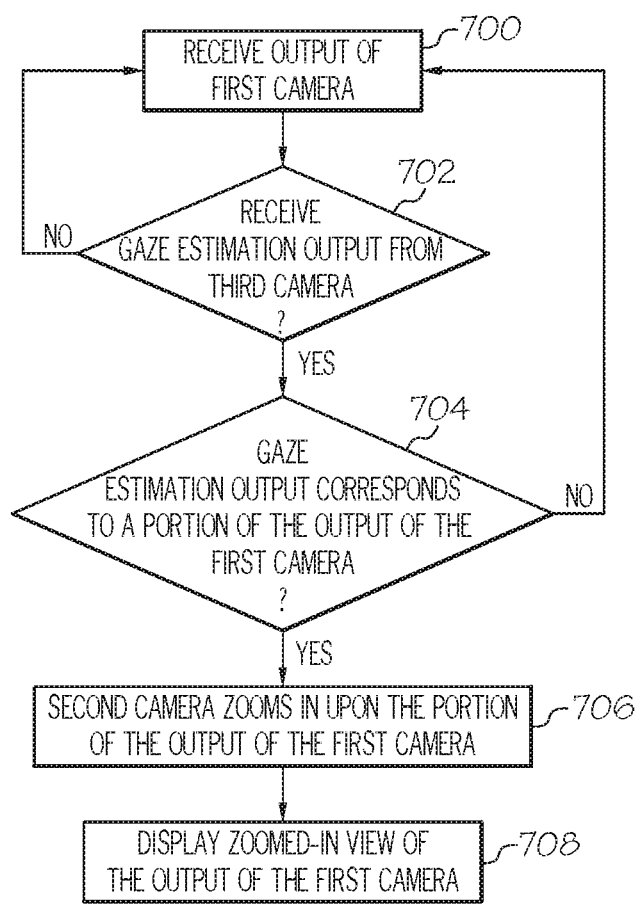
FIG. 7 depicts a flowchart of an exemplary process for gaze estimation, according to one or more embodiments shown and described herein.

Turning to FIG. 7, a flowchart illustrates an exemplary process for gaze estimation. At block 700, output of a first camera is received, which may correspond to a wide angle camera. At block 702, if gaze estimation output from third camera is received, which may correspond to an output from a gaze detector in some embodiments, the flowchart may proceed to block 704. Otherwise, the flowchart may return to receiving more output from the first camera at block 700. At block 704, if gaze estimation output corresponds to a portion of the output of the first camera, the flowchart proceeds to block 706. Otherwise, the flowchart may return to receiving more output from the first camera at block 700. In some embodiments, the second camera may assist by looking at a portion of the output from the first camera that differs from the gaze detection, such as when a vehicle may be approaching from a direction that differs from direction corresponding to the gaze detection. At block 706, a second camera may zoom in upon the portion of the output of the first camera. The second camera may correspond to a tracking camera. At block 708, a zoomed-in view of the output of the first camera may be displayed.

Figure 8:
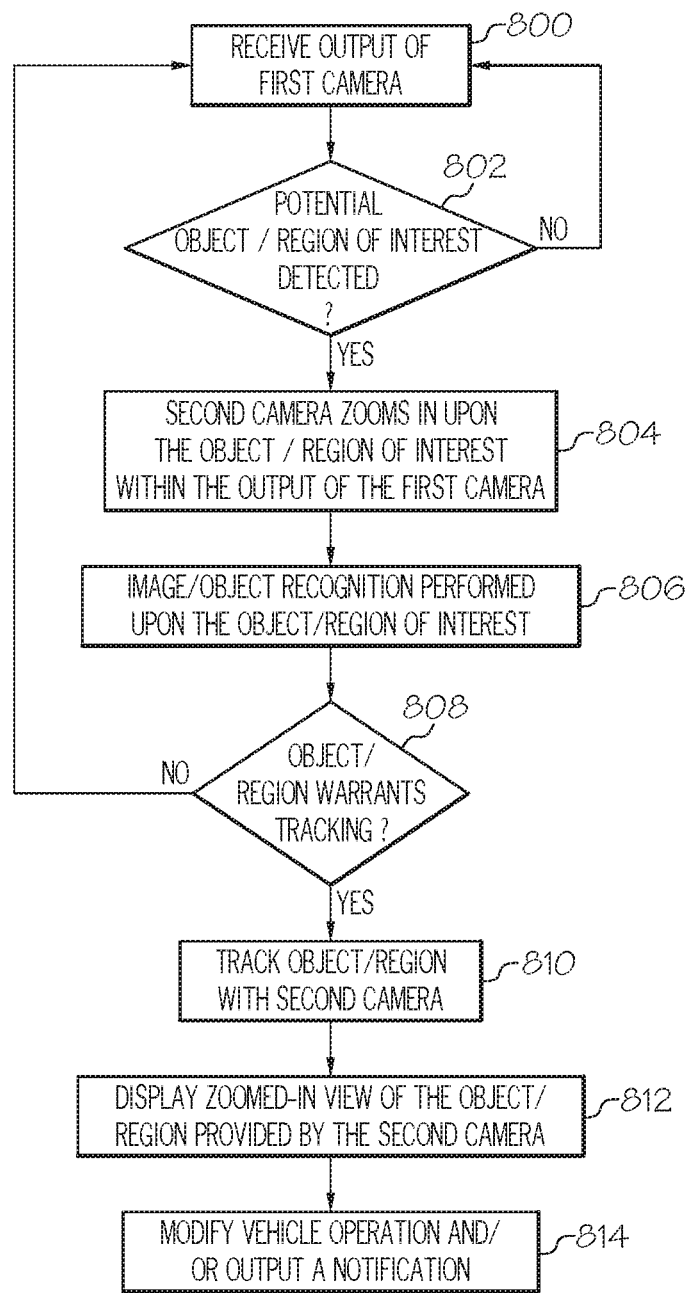
FIG. 8 depicts a flowchart of an exemplary process for an intelligent camera zoom, according to one or more embodiments shown and described herein.

Turning to FIG. 8, a flowchart illustrates an exemplary process for an intelligent camera zoom. At block 800, output from a first camera is received, which may correspond to a wide angle camera. At block 802, if a potential object or region of interest detected, the flowchart may proceed to block 804. Otherwise, the flowchart may return to receiving more output from the first camera at block 800. At block 804, a second camera may zoom in upon the object/region of interest within the output of the first camera, where the second camera may correspond to a tracking camera. At block 806, image/object recognition may be performed upon the object or region of interest. At block 808, if the object/region of interest warrants tracking, the flowchart may proceed to block 810. Otherwise, the flowchart may return to receiving more output from the first camera at block 800. At block 810, an object or region of interest may be tracked with the second camera. In various embodiments, tracking an object and/or region may entail, by way of non-limiting examples, panning and/or tilting a camera to follow lateral and/or vertical movement, zooming in/out to maintain a size/proportion within the view, and/or maintaining the object and/or region in focus to prevent blurring or other loss of detail, etc. At block 812, a zoomed-in view of the object or region of interest provided by the second camera may be displayed. At block 814, vehicle operation may be modified and/or a notification may be output. For example, the vehicle may, upon detection of an object such as a pedestrian running into the path of the vehicle, decelerate and/or modify its path to avoid hitting the pedestrian. As another example, an audio and/or visual alert to the driver, such as a beep and a flash on a display, may be presented to alert the driver to the hazard posed by another vehicle approaching from a tangential direction at a high rate of speed.

Figure 9:
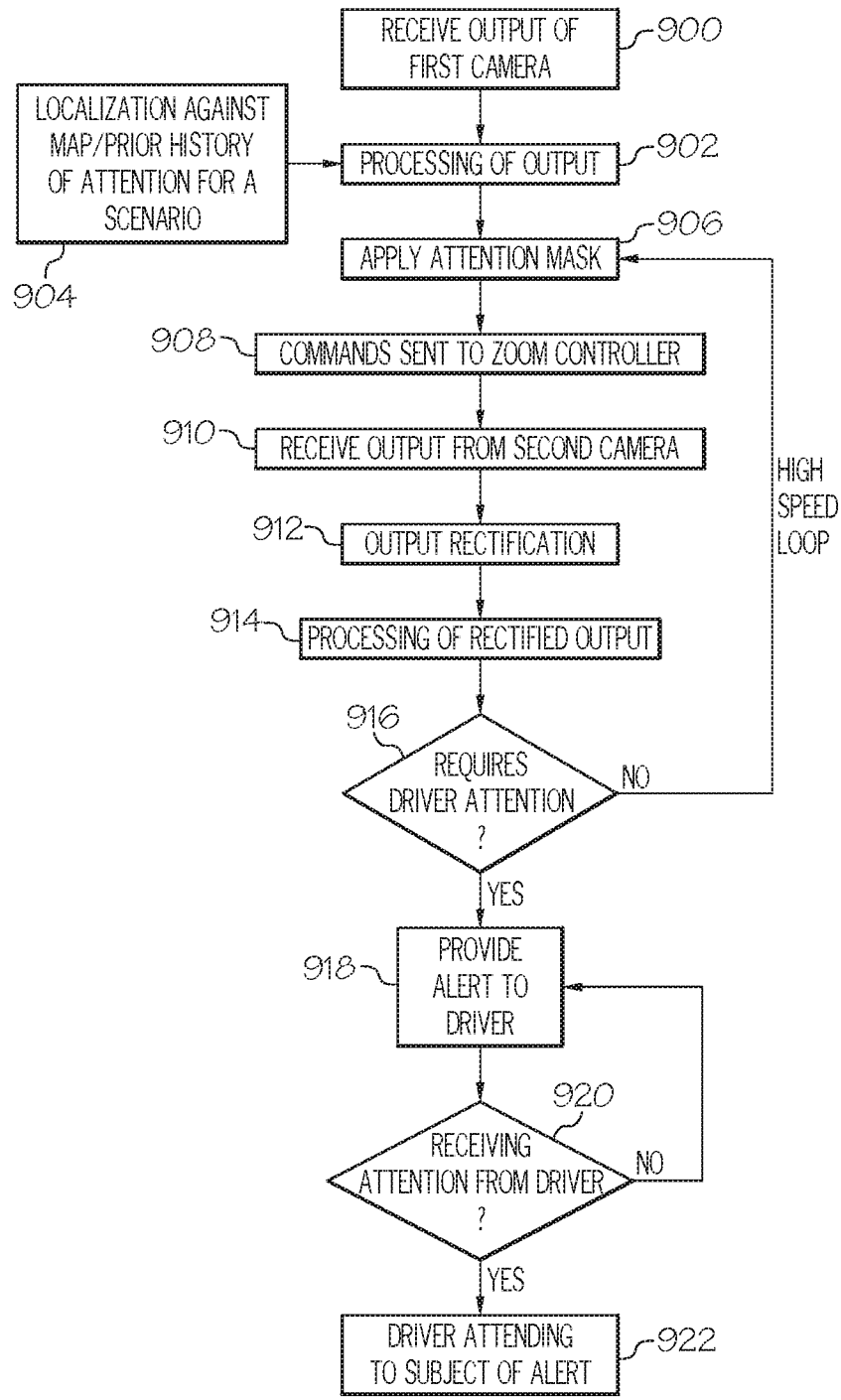
FIG. 9 depicts a flowchart of an exemplary process for driver assistance with an intelligent camera system, according to one or more embodiments shown and described herein.

Turning to FIG. 9, a flowchart illustrates an exemplary process for driver assistance with an intelligent camera system. At block 900, output is received from a first camera, which may be any type of camera, such as a wide angle camera. At block 902, output from the first camera is processed, which is further based on localization against map/prior history of attention for a scenario at block 904. For example, geographic and/or prior history associated with a type of scenario at block 904 may be utilized to help interpret what the first camera observes at block 900, where the processing at block 902 may utilize any suitable technique, such as neural networks and various types of machine learning algorithms. At block 906, an attention mask may be applied. An attention mask may include, for example, an indicator applied to the output of the first camera to indicate to a vehicle occupant that there is an object or region of interest present within, for example, a wide angle view. At block 908, commands may be sent to a zoom controller for the second camera to direct attention to the object or region of interest by zooming in, for example.

At block 910, output from the second camera may be received. At block 912, output rectification may occur, which may include, for example, object recognition performed upon the object or region of interest to identify it. At block 914, rectified output may processed, which may include obtaining further information about the object or region of interest. For example, an unknown object detected by the first camera may be identified, based on the zoom view of the second camera, and determined to be a deer. In this example, the initial output presented would be updated, once the output is rectified, to indicate that the unknown object has been identified as a deer. At block 916, if the output from the second camera requires driver attention, the flowchart proceeds to block 918. Otherwise, the flowchart may return to applying an attention mask at block 906, thus forming a loop in some embodiments. In some embodiments, this loop (applying an attention mask, having commands sent to the zoom controller, receiving output from the second camera, output rectification, processing of the rectified output, and determining whether driver attention is required) may run as a high-speed loop, although any suitable speed (including varying speeds) may be utilized in other embodiments. In various embodiments, the speed of the loop may vary according to any number of factors, such as processing limitations of the system, quantity of objects and/or regions of interest, lighting conditions, etc. At block 918, an alert may be provided to the driver. At block 920, if attention from driver is received, the flowchart proceeds to block 922. Otherwise, the flowchart may return to alerting the driver at block 918. At block 922, the driver has attended to or acknowledged the subject of alert.

Figure 10:
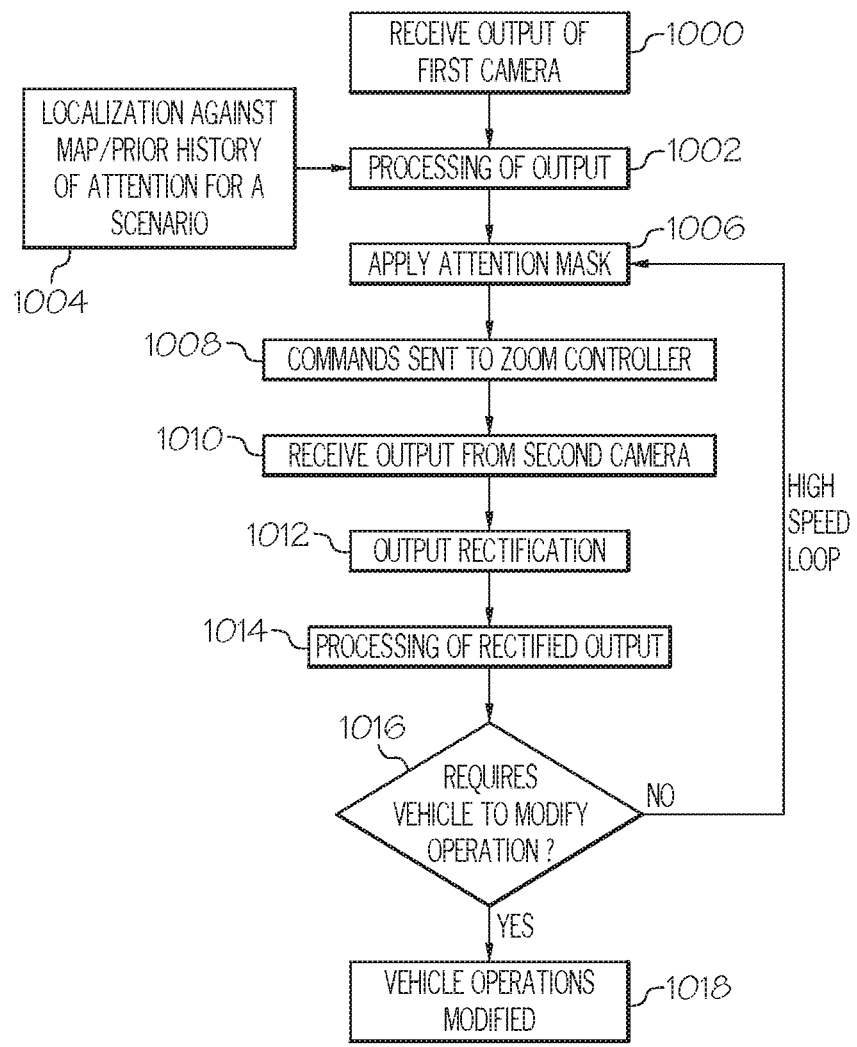
FIG. 10 depicts a flowchart of an exemplary process for autonomous vehicle utilization of an intelligent camera system, according to one or more embodiments shown and described herein.

Turning to FIG. 10, a flowchart illustrates an exemplary process for autonomous vehicle utilization of an intelligent camera system. At block 1000, output is received from a first camera, which may be any type of camera, such as a wide angle camera 102. At block 1002, output from the first camera is processed, which is further based on localization against map/prior history of attention for a scenario at block 1004. For example, geographic and/or prior history associated with a type of scenario at block 1004 may be utilized to help interpret what the first camera observes at block 1000, where the processing at block 1002 may utilize any suitable technique, such as neural networks and various types of machine learning algorithms. At block 1006, an attention mask may be applied. For example, an indicator may be applied to the output of the first camera to output to a computer system, such as in an autonomous or semi-autonomous vehicle, that there is an object or region of interest present within, for example, a wide angle view. At block 1008, commands may be sent to a zoom controller for the second camera to direct attention to the object or region of interest by zooming in, for example. At block 1010, output from the second camera may be received. At block 1012, output rectification may occur, which may include, for example, object recognition performed upon the object or region of interest for identification or classification. At block 1014, rectified output may processed, which may include further information about the object or region of interest. At block 1016, if the output from the second camera requires a modification of operation of the vehicle, the flowchart may proceed to block 1018. Otherwise, the flowchart may return to applying an attention mask at block 1006. In some embodiments, this loop may run as a high-speed loop, although any suitable speed (including varying speeds) may be utilized in other embodiments. At block 1018, vehicle operation has been modified. For example, upon detection of a potential hazard, the vehicle 100 reduces its speed.

Figure 11:
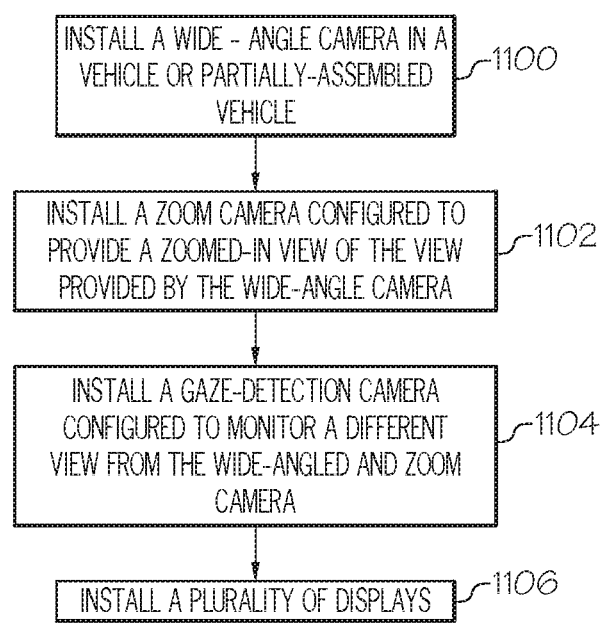
FIG. 11 depicts a flowchart of an exemplary process for assembling an intelligent camera system, according to one or more embodiments shown and described herein.

Turning to FIG. 11, a flowchart illustrates an exemplary process for assembling an intelligent camera system. At block 1100, a wide angle camera is installed in a vehicle or partially-assembled vehicle, such as the wide angled camera disclosed herein. At block 1102, a tracking camera configured to provide a zoomed-in view of the view provided by the wide-angle camera is installed, such as the tracking camera disclosed herein. At block 1104, a gaze-detection camera configured to monitor a different view from either the wide-angled camera or tracking cameras is installed. At block 1106, a plurality of displays is installed. The wide angle camera and tracking cameras are communicatively coupled to the gaze detection camera, which are all interconnected with the plurality of displays to function as described herein.

It should now be understood that embodiments described herein are directed to detection of objects by an intelligent camera system. With a fixed camera providing a wide angle view, a tracking camera may provide a zoom view of objects and regions of interest to track and identify potential hazards. The tracking camera may utilize mirror-based actuation to provide rapid and accurate object tracking. A gaze estimation camera may track and/or estimate a driver's eye movements to direct the tracking camera to act as a second pair of eyes for the driver. This type of intelligent camera system may then provide for alerts and/or modifications to vehicle operation that can lead to improved operation based on the object detection, analysis, and tracking.

Additional features may include receiving the zoom view wherein the zoom view is obtained by the second camera utilizing a moveable mirror and receiving, from a third camera in the vehicle, gaze estimation data pertaining to an occupant of the vehicle wherein the zoom view of the region of interest corresponds to the gaze-tracking data pertaining to the occupant of the vehicle. Another feature may include receiving recognition data pertaining to an object within the zoom view data corresponding to the zoom view of the region of interest provided by the second camera and outputting an alert to an occupant of the vehicle based upon the zoom view data corresponding to the zoom view of the region of interest provided by the second camera. Another feature may include modifying operation of the vehicle based upon the zoom view data corresponding to the zoom view of the region of interest provided by the second camera.

Other features may include programming instructions that, when executed, cause a processing device to receive the zoom view wherein the zoom view is obtained by the second camera utilizing a moveable mirror and to receive gaze estimation data from a third camera wherein a zoom view of the region of interest corresponds to the gaze-tracking data. Additional instructions may include instructions to receive recognition data pertaining to an object within the zoom view data corresponding to the zoom view of the region of interest provided by the second camera and to output an alert based upon the zoom view data corresponding to the zoom view of the region of interest provided by the second camera.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

What is claimed is:

1. A method of vehicle-based hazard detection utilizing cameras to improve vehicular operation, the method comprising:
   receiving, from a first camera in a vehicle, view data corresponding to an area from a vantage point of the vehicle to modify operation of the vehicle;
   detecting a region of interest from the view data provided by the first camera;
   providing the region of interest to a second camera in the vehicle;
   receiving, from the second camera, zoom view data corresponding to a zoom view of the region of interest; and
   receiving, from a third camera in the vehicle, gaze estimation data pertaining to an occupant of the vehicle gazing outside the vehicle, wherein the zoom view of the region of interest corresponds to gaze estimation data.

2. The method of claim 1, further comprising receiving recognition data pertaining to an object within zoom view data corresponding to the zoom view of the region of interest provided by the second camera.

3. The method of claim 2, further comprising outputting an alert to an occupant of the vehicle based upon the zoom view data corresponding to the zoom view of the region of interest provided by the second camera.

4. The method of claim 1, further comprising modifying operation of the vehicle based upon zoom view data corresponding to the zoom view of the region of interest provided by the second camera.

5. The method of claim 1, wherein the third camera is located within the vehicle and faces an interior compartment of the vehicle.

6. The method of claim 1 further comprising alerting the occupant regarding another vehicle approaching from a tangential direction.

7. A vehicle comprising a camera system for hazard detection to improve vehicular operation, the camera system comprising:
   a processing device; and
   a non-transitory, processor-readable storage medium, the non-transitory, processor-readable storage medium comprising one or more programming instructions that, when executed, cause the processing device to modify operation of the vehicle by performing at least the following:
     receive, from a first camera in a vehicle, view data corresponding to an area from a vantage point of the vehicle;
     detect a region of interest from the view data provided by the first camera;
     provide the region of interest to a second camera in the vehicle;
     receive, from the second camera, zoom view data corresponding to a zoom view of the region of interest; and
     receive, from a third camera in the vehicle, gaze estimation data pertaining to an occupant of the vehicle gazing outside the vehicle, wherein the zoom view of the region of interest corresponds to the gaze estimation data.

8. The vehicle of claim 7, wherein the non-transitory, processor-readable storage medium further comprises one or more programming instructions that, when executed, cause the processing device to receive the zoom view wherein the zoom view is obtained by the second camera utilizing a moveable mirror.

9. The vehicle of claim 7, wherein the non-transitory, processor-readable storage medium further comprises one or more programming instructions that, when executed, cause the processing device to receive recognition data pertaining to an object within zoom view data corresponding to the zoom view of the region of interest provided by the second camera.

10. The vehicle of claim 7, wherein the non-transitory, processor-readable storage medium further comprises one or more programming instructions that, when executed, cause the processing device to output an alert to an occupant of the vehicle based upon zoom view data corresponding to the zoom view of the region of interest provided by the second camera.

11. The vehicle of claim 7, wherein the non-transitory, processor-readable storage medium further comprises one or more programming instructions that, when executed, cause the processing device to modify operation of the vehicle based upon zoom view data corresponding to the zoom view of the region of interest provided by the second camera.

12. The vehicle of claim 7, wherein the third camera faces an interior compartment of the vehicle.

13. The method of claim 12, further comprising tracking a gaze of a passenger in an interior compartment of the vehicle via the third camera.

14. The vehicle of claim 12, further comprising tracking a gaze of a passenger in the interior compartment of the vehicle via the third camera.

15. A camera system for hazard detection, the system comprising:

a processing device; and a non-transitory, processor-readable storage medium, the non-transitory, processor-readable storage medium comprising one or more programming instructions that, when executed, cause the processing device to perform at least the following:

receive, from a first camera, view data of an area from a vantage point of the system;

output the view data to a display device;

detect a region of interest within the view data provided by the first camera;

provide the region of interest to a second camera;

receive, from the second camera, zoom view data corresponding to a zoom view of the region of interest;

receive gaze estimation data from a third camera, wherein the zoom view of the region of interest corresponds to the gaze estimation data pertaining to an occupant of the vehicle gazing outside the vehicle; and output the zoom view data corresponding to the zoom view of the region of interest to the display device.

16. The system of claim 15, wherein the non-transitory, processor-readable storage medium further comprises one or more programming instructions that, when executed, cause the processing device to receive the zoom view wherein the zoom view is obtained by the second camera utilizing a moveable mirror.

17. The system of claim 15, wherein the non-transitory, processor-readable storage medium further comprises one or more programming instructions that, when executed, cause the processing device to receive recognition data pertaining to an object within zoom view data corresponding to the zoom view of the region of interest provided by the second camera.

18. The system of claim 15, wherein the non-transitory, processor-readable storage medium further comprises one or more programming instructions that, when executed, cause the processing device to output an alert based upon zoom view data corresponding to the zoom view of the region of interest provided by the second camera.

19. The system of claim 15, further comprising tracking a gaze of a passenger in an interior compartment of a vehicle via the third camera.

20. The system of claim 15, wherein the non-transitory, processor-readable storage medium further comprises one or more programming instructions that, when executed, further cause the processing device to:

detect a region of interest from the view data provided by the first camera, which further comprises programming instructions to process the view data from the first camera against a prior history for attention pertaining to a scenario; and provide the region of interest to a second camera in the vehicle which further comprises programming instructions to apply an attention mask on the display device to indicate the region of interest.

* * * * *